United States Patent
Uladzimir

(10) Patent No.: US 7,532,051 B2
(45) Date of Patent: May 12, 2009

(54) METHOD AND APPARATUS FOR SELECTION OF AN INTERNAL OR EXTERNAL TIME DELAY

(75) Inventor: Fomin Uladzimir, Minsk (BY)

(73) Assignee: Neotec Semiconductor Ltd., Hsinchu (TW)

( * ) Notice: Subject to any disclaimer, the term of this patent is extended or adjusted under 35 U.S.C. 154(b) by 0 days.

(21) Appl. No.: 11/634,177

(22) Filed: Dec. 6, 2006

(65) Prior Publication Data

US 2007/0080735 A1    Apr. 12, 2007

(30) Foreign Application Priority Data

Dec. 6, 2005    (TW) ............... 94143045 A

(51) Int. Cl.
*H03L 7/00*    (2006.01)
(52) U.S. Cl. ...................... 327/161; 327/261
(58) Field of Classification Search ............. None
See application file for complete search history.

(56) References Cited

U.S. PATENT DOCUMENTS 6,646,944 B2 * 11/2003 Shimano et al. ............. 365/222
7,129,760 B2 * 10/2006 Millar ........................ 327/158
2006/0044020 A1 * 3/2006 Aipperspach et al. ....... 326/121

* cited by examiner

*Primary Examiner*—Cassandra Cox
(74) *Attorney, Agent, or Firm*—Muncy, Geissler, Olds & Lowe, PLLC

(57) ABSTRACT

A time delay circuit in a battery protection chip for an internal time delay or external time delay selection is disclosed. The protection chip has a selective pin for choosing the internal time delay while the selective pin is floated or the external time delay while the selective pin is connected with a capacitor. The time delay circuit is composed of a charge-discharge circuit, a D flip-flop, a RS latch, a NOR gate, and a 2 to 1 multiplexer (MUX 2:1). According to an embodiment, if the selective pin is floated, the outputs of the D flip-flop, and the RS latch will make MUX 2:1 choose an output signal of the NOR gate having input signals of an internal delay signal and input signal. On the other hand, if the selective pin is connected with an external capacitor having an external capacitance of more than 250 pF, the output signal of the D flip-flop, and the RS latch will make MUX 2:1 choose an output of the charge-discharge circuit but ignore the internal delay signal.

10 Claims, 3 Drawing Sheets

METHOD AND APPARATUS FOR SELECTION OF AN INTERNAL OR EXTERNAL TIME DELAY

BACKGROUND OF THE INVENTION

1. Field of the Invention

The invention relates to a delay circuitry for battery protection, particularly to a circuit having functions of automatically choose one from between an inner delay and external delay according to the requirement.

This application claims priority from Taiwanese Application No. 094143045, filed Dec. 6, 2005.

2. Description of the Prior Art

Generally, a battery is the only power source for all kinds of mobile electronic apparatus. With the popularity of the mobile phone, Notebook computer, personal digital assistance (PDA), MP3 player, the reliance on battery is significantly increased. The handheld appliance goes to have characteristic of light, slim, short, and small but has multi-functions are often preferred, to solve this dilemma, decrease the power consummation of the integrate circuit and increase the cell capacity become necessary.

Li-ion cell is known to have such characteristic: small volume, high charge capacity, without memory effect, long life, low discharge ability by itself, thus trying to capitalize the Li-ion cell as main power of the mobile device with chargeable cell is a wave that can not be blocked. As alike as material properties of Ni—Cd cell or Ni—H battery does, it has to be taken charge and discharge of the battery into account to prevent them from material degradation so as to have better performance. Particularly, for the Li-ion battery, it often has a battery protective circuit because it has the highest unit cost among them. Improper over discharge or overcharge or even overcurrent to a battery, is readily to cause the battery lifetime shortening.

Similar to a chip control, a battery protective circuit has to filter out those probable noises so as to avoid inducing malfunction, such as overcharge or overdischarge. The noises induced typically are due to a ripple voltage over the detecting threshold during switching. Hence, a delay circuit is designed in the battery protective circuit for this purpose. Only those pulse extended over the delay time are taken as a signal, or it will be taken as a noise and will be neglected. The conventional approaching to the time delay for battery protective circuit is implemented by an external capacitor which is connected to a pin COL of the battery protective IC. The capacitor can be replaced with an appropriate capacitance in accordance with the requirement. Some of cases are done by using internal signal because the delay is usually fixed and can't be adjusted as easy as an external capacitor. However, even the time delay is fixed, the internal delay signal is usually enough to apply to most of the requirements. Besides one of external components, an external capacitor, can be removed. Even though, clients are often favor a battery protective IC provided with an external delay therein for choice.

An object of the present invention thus provides a battery protective IC, which automatically chooses an internal delay signal as a delay time when the pin COL is floated and the delay time determined by a capacitor when the capacitor is connected with the pin COL.

SUMMARY OF THE INVENTION

A time delay circuit in a battery protection chip for switching to an internal time delay or an external time delay automatically is disclosed. The protection chip has a selective pin for choosing the internal time delay while the selective pin is connected with a small stray capacitor and therefore is considered as floating or for choosing the external time delay while the selective pin is connected with an external dedicated capacitor. The time delay circuit is composed of a charge-discharge circuit, a D flip-flop, a RS latch, a 2 to 1 multiplexer (MUX 2:1), a buffer, and an inverter. The D flip-flop is used just as one-clock-period counter. If the capacitor is discharged to lower than a threshold voltage within the runout time of counter, the RS latch will be switched to select the internal delay by the 2-to-1 multiplexer (MUX 2:1). The RS latch can be implemented by either NAND type RS latch or NOR type RS latch. According to an embodiment, if the selective pin is floating, the outputs of the D flip-flop, and the RS latch will make MUX 2:1 choose an output signal of the NOR gate having input signals of an internal delay signal and an IN signal. On the other hand, if the selective pin is connected with an external capacitor having an external capacitor with capacitance of more than 250 pF for example, the output signal of the D flip-flop and the RS latch will make MUX 2:1 choose an output of the charge-discharge circuit and to ignore the internal delay signal.

BRIEF DESCRIPTION OF THE DRAWINGS

The present invention will be more fully understood from the detailed description, which will be given hereinafter, with the aid of the illustrations below.

DESCRIPTION OF THE PREFERRED EMBODIMENT

As foregoing descriptions, the battery protective IC must have a delay circuit to distinguish the signal from noise so as to avoid the IC from error operation. Some of the battery protective IC use an external capacitor connected with the pin COL to approach the time delay purpose. The other approach utilizes the internal signal. Foregoing approaches can't be switched automatically to choose the internal time delay or external time delay in accordance with the prior art, thus it is not convenient.

Figure 1A:
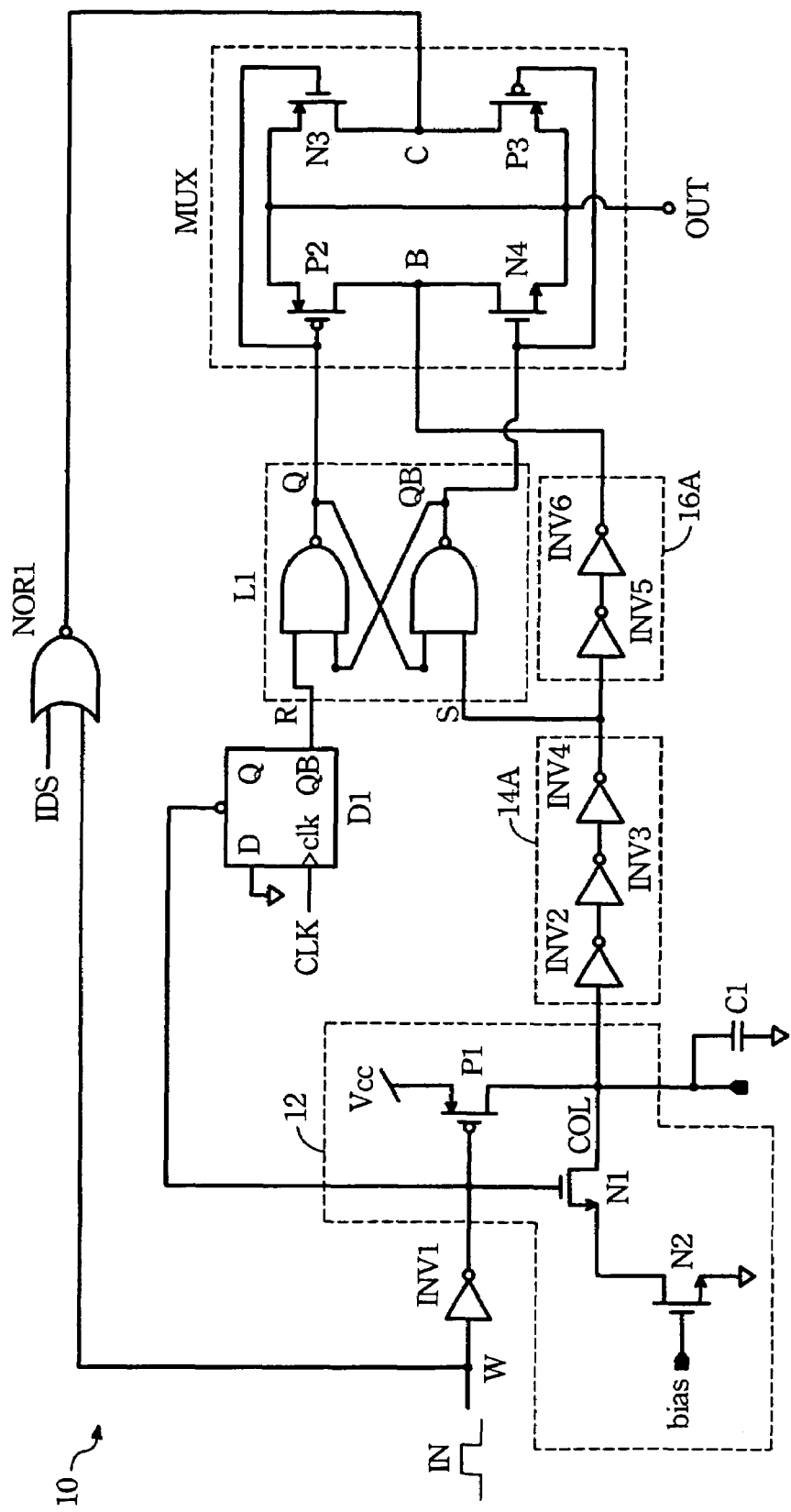
FIG. 1A shows the time delay signal selection circuit according to a first preferred embodiment of the present invention.
Figure 1B:
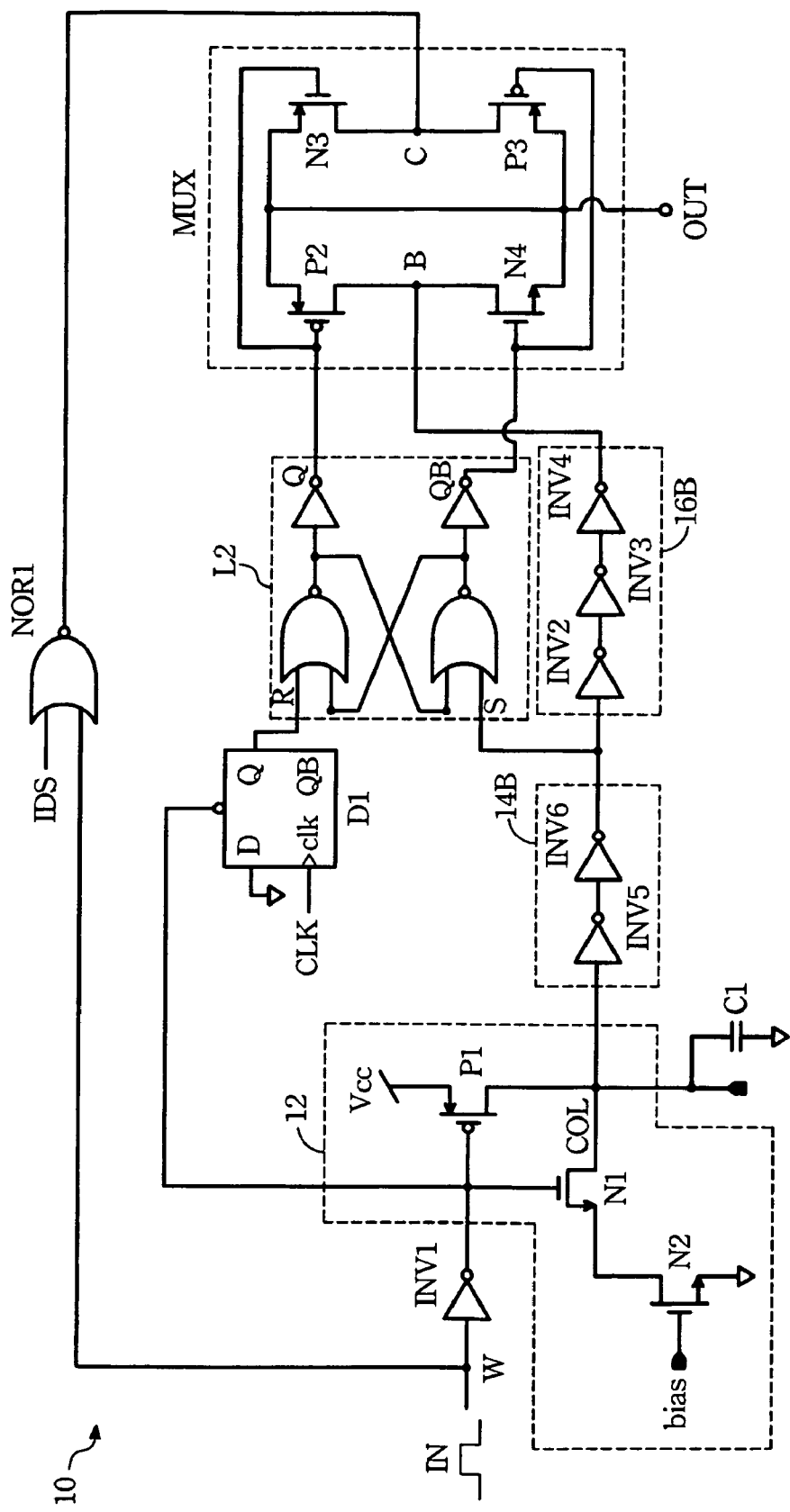
FIG. 1B shows the time delay signal selection circuit according to-a second preferred embodiment of the present invention.

Accordingly, the present invention provides a circuitry 10 shown in FIG. 1A and FIG. 1B to resolve above problem. The differences between two are the RS latch composed of NAND type, as is shown in FIG. 1A or NOR type, as is shown in FIG. 1B. Since the operation principles of them are almost the same except the situations of competition and none change occurrence for Q and QB are oppose for R terminal and S terminal according to the truth table. Hence the following illustration will focus on FIG. 1A only. The illustration for FIG. 1B is skipped.

The circuitry 10, as shown in FIG. 1A includes: an inverter INV1, charge-discharge circuit 12, inverter-buffer 14 (consisting of odd number of inverters INV2, INV3, Inv4), buffer 16 (consisting of even number of inverters INV5, INV6), D flip-flop (hereinafter called $D_{13}$ FF) D1, RS latch L1, NOR gate NOR1, 2 to 1 multiplexer MUX (hereinafter called MUX 2:1), pin COL, and capacitor C1. The D flip-flop is used just as one-clock-period counter. If the capacitor is discharged to lower than a threshold voltage within the runout time of counter, the RS latch will be switched to select the internal delay by the 2-to-1 multiplexer (MUX 2:1). User can select an internal time delay having a desired time delay just by means of the capacitor C1 replacement or select an internal time delay while the pin COL without an external capacitor automatically. Generally the stray capacitor always exists on any pin so the least capacitance of the capacitor C1 is required to be greater than maximal possible stray capacitance, for example 250 pF.

Referring to FIG. 1A, the transistors P1 (PMOS) and N1 (NMOS) of the charge-discharge circuit 12 is controlled by the output signal of the inverter INV1. As the signal switched ON the transistor P1, transistor N1 OFF at meantime, the voltage of the pin COL and the capacitor C1 will be charged up to Vcc. On the contrary, P1 OFF and N1 ON, the capacitor C1 will be discharged through transistors N1, and N2. The discharging current is defined by the Bias voltage. The D_FF D1 is a signal low preset FF with an input internal grounded and output signal toggled by an edge-triggered clock CLK. The output terminal QB of D_FF D1 is fed to R (reset) terminal of the RS latch L1.

Furthermore, S (set) terminal of the RS latch L1 is controlled by the output of the inverter-buffer 14. The output terminal Q of RS latch controls the transistors P2, N3 of the MUX 2:1. The output terminal QB controls the transistors N4, P3 of the MUX 2:1.

The MUX 2:1 is composed of a first CMOS GATE P2, N4 and a second CMOS GATE N3, P3. The node B of the drain of first CMOS GATE P2, N4 and node C of the drain of second CMOS GATE N3, P3 are input terminals of the MUX 2:1. The nodes of the sources of the first CMOS GATE P2, N4 and the second CMOS GATE N3, P3 are an output terminal of the MUX 2:1. The input terminal B is fed by an output signal of the buffer 16 and the input terminal C is fed by an output signal of the NOR gate NOR1.

For the embodiment of the pin COL having an external capacitor connected: Referring to a timing signal diagram showing in FIG. 2A and circuitry diagram FIG. 1A simultaneously, assuming the internal time delay signal IDS is a pulse duration of about several clocks and a signal IDS is fed one input terminal of NOR gate NOR1, the output of the NOR gate NOR1 is always at a low state, 0 as the signal IDS at a high state 1. Thus, the other input terminal of the NOR 1 has not to be cared until the signal IDS is changed to 0. Consequently, as an input signal IN at state 1 is fed from the input terminal W of the inverter INV1 and the other input terminal NOR1 (at this time, the output of NOR1 always at 0), then after pass through the capacitor C1 charging path, the inverter INV1, transistor P1, pin COL, and capacitor C1, the pin COL will be at state 1.

As the output of the inverter INV1 is at state 1, the DFF D1 will not be edged triggered until the time reaches t2, the next CLK against time t1, the output QB of the DFFD1 is changed from 0 to 1 state. The QB is fed to terminal R, result in resetting the RS latch L1.

Figure 2A:
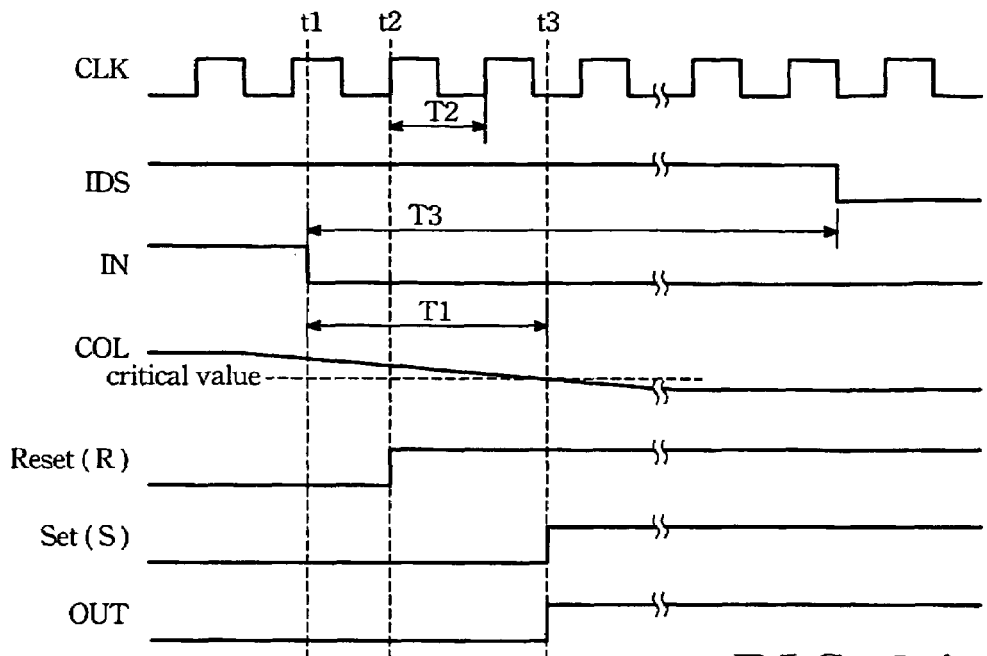
FIG. 2A shows the timing signal diagram views from connected nodes of the time delay signal selection circuit as the pin COL is connected with an external capacitor.

On the other hand, at t1, the signal t1 is changed from 1 to 0, so that the transistor P1 is turned OFF but N1 turned ON, the capacitor C1 will be discharged through a discharged path N1, N2 from a saturated voltage VCC down to ground. The signal BIAS determines the current of the transistor N2. Consequently, the external delay time is determined by discharged time T1 of the capacitance of C1, which is the terminal voltage of the capacitor C1 is down from VCC to lower than a threshold voltage, Then If T1>T2 (one clock time), the RS latch L1 will be set by the set terminal S=1, as shown in FIG. 2A.

The R terminal changed from 0 to 1 is earlier than S terminal changed from 0 to 1. In other words, set RS latch L1 by the terminal S is lapped behind reset by the terminal R by a discharging time of capacitor C1. As a result, the output Q of the RS latch L1 becomes 0 so that the transistors P2 and N4 are turned ON. The terminal S=1 does not changed the result of the output Q of the RS latch L1. As S terminal is at state 1 when the capacitor C1 is discharged to state 0, the node B is at state 1 too. As a result, the output of the MUX 2:1 is at state 1.

The aforementioned embodiment illustrates the circuitry according to the present invention is delayed by T2 after an input signal IN is inputted. The T2 is dependent on capacitance of the capacitor C1 but independent on internal signal IDS.

Figure 2B:
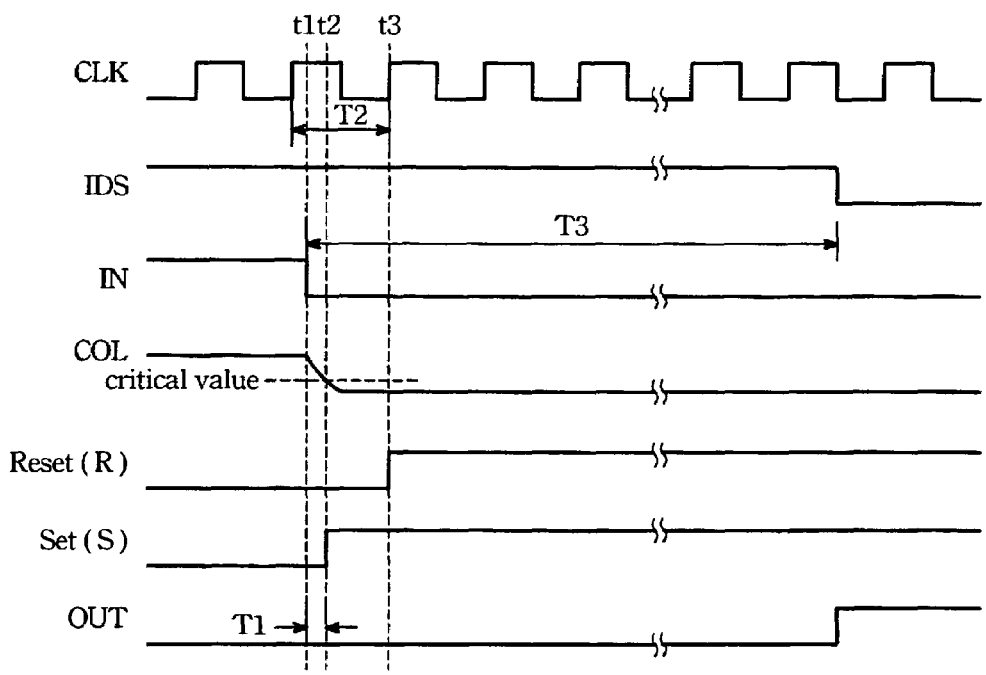
FIG. 2B shows the timing signal diagram views from connected nodes of the time delay signal selection circuit as the pin COL is floated.

For the embodiment with a floated pin COL: Referring to a timing signal diagram showing in FIG. 2B and circuitry diagram FIG. 1A simultaneously, the relationship of the IDS to NOR1 is as foregoing descriptions. Since the pin COL is floated, the voltage of the pin COL is almost at once in response to the state of the input signal IN. As a signal IN is changed from 1 to 0, COL is changed from 1 to 0, the terminal S of the NAND RS latch L1 is changed from 0 to 1 immediately. On the other hand, the terminal R will not be changed from 0 to 1 till the next clock period. On other words, the output terminal Q of the RS latch L1 is equal to 1, the other terminal QB will be at 0 state and be latched. At the time, the transistors P2, N4 of the MUX 2:1 are turned OFF. By contrast, the transistors N3, P3 will be turned ON. The OUT terminal of the MUX 2:1 is determined by the output signal of the NOR gate NOR1. Since the signal IN is at 0 state and if the internal signal IDS is changed from 1 to 0 after a time delay T3, the output of the NOR gate NOR1 (node C) will be changed to 1. As a result, the output OUT will be also changed to 1.

The aforementioned second embodiment of pin COL floated illustrates the signal outputted from the OUT terminal of the circuitry according to the present invention is delayed by T3 after an input signal IN is inputted.

The benefits of the present invention are as follows:
(1) The circuitry provides an extra time delay selection than the prior art.
(2) No extra pin on IC chip is demanded. Without an extra capacitor the time delay is determined by the internal time delay signal and the time delay is automatically switched to an external capacitor if it is connected to pin COL.

As is understood by a person skilled in the art, the foregoing preferred embodiment of the present invention is an illustration, rather than a limiting description, of the present invention. It is intended to cover various modifications and similar arrangements included within the spirit and scope of the appended claims, the scope of which should be accorded the broadest interpretation so as to encompass all such modifications and similar structures.

What is claimed is:

1. A time delay circuit in a battery protection chip for selecting either an internal delay signal or an external delay signal, comprising:
   a logic gate having two input terminals receiving, respectively, an inputting signal and said internal delay signal;
   a charge-discharge circuit having an input terminal for receiving said inputting signal, and having a first output terminal as a selecting terminal for said internal delay signal and said external delay signal selection, said first output terminal in series connected with an external capacitor to ground;

one-clock-period timer coupled with said input terminal of said charge-discharge circuit;

an inverse buffer serving as a threshold detector of said charge-discharge circuit;

a RS latch having a R terminal connected with an output terminal of said one-clock-period timer, and having a S terminal connected with an output terminal of said inverse buffer;

a 2-to-1 multiplexer (MUX 2:1) having two input terminals receiving, respectively, an output signal of said inverse buffer and an output signal of said logic gate by means of two output signals of said RS latch as control signals; and wherein when said external capacitor is discharged to lower than a threshold voltage of said inverse buffer within the runout time of said one-clock-period timer, said internal delay signal will be selected, otherwise, said external delay signal whose delay time depends on said external capacitor will be selected.

2. The time delay circuit according to claim 1 wherein said one-clock-period timer is a D flip-flop having a D terminal grounded and a reset terminal coupled with said inputting signal and having an output terminal QB thereof connecting with said R terminal.

3. The time delay circuit according to claim 1 wherein said 2-to-1 multiplexer (MUX 2:1) consists of a first CMOS GATE and a second CMOS GATE, further, all sources of said first CMOS GATE and said second CMOS GATE are connected as an output terminal of said time delay circuit, and gates of the PMOS of said first CMOS GATE and the NMOS of said second CMOS GATE are connected as a first selection terminal and gates of the NMOS of said first CMOS GATE and the PMOS of said second CMOS GATE are connected as a second selection terminal, furthermore, a drain of the first CMOS GATE is serving as a first input terminal and a drain of the second CMOS GATE is serving as a second input terminal.

4. The time delay circuit according to claim 3 further comprises a buffer connected in between said output terminal of said inverse buffer and one of said two input terminals of said 2-to-1 multiplexer(MUX 2:1) to prevent said second selection terminal and said second input terminal from running with competition.

5. The time delay circuit according to claim 1 wherein said RS latch is an NAND type RS latch.

6. A time delay circuit in a battery protection chip for an internal delay signal or an external delay signal selection, comprising:

an internal delay signal;

a charge-discharge circuit having an input terminal for receiving an inputting signal, and a first output terminal for a time delay signal selection wherein said charge-discharge circuit is composed of a first transistor, a second transistor, and a third transistor, and further, said first transistor is a conductive type being opposite to said second transistor and both of them are controlled by the inputting signal and with the drains thereof connected as said first output terminal, and still the source of said second transistor is connected with the drain of said third transistor having the source grounded and the gate controlled by a bias signal;

a first logic gate for receiving said internal delay signal and the inputting signal;

a D flip-flop having an input terminal grounded, a clock terminal for receiving a clock signal, and a presetting terminal for receiving the inputting signal;

a RS latch having a reset terminal connected to an output terminal Q of the D flip-flop, and a set terminal;

a buffer connected in between said first output terminal and said set terminal;

an inverse-buffer having an input terminal connected to an output terminal of said buffer; and a two to 1 multiplexer (MUX 2:1) having a first input terminal, a second input terminal, a first selective terminal, and a second selective terminal, wherein said first selective terminal, and said second selective terminal are, respectively, connected with two output terminals of said RS latch, and said first input terminal and said second input terminal are, respectively, connected to an output terminal of said inverse-buffer and an output terminal of said first logic gate.

7. The time delay circuit according to claim 6 wherein said time delay circuit will select said external delay signal whose delay time depends on an external capacitor if said first output terminal is connected with said external capacitor.

8. The time delay circuit according to claim 6 wherein said internal delay signal will be selected by said time delay circuit while said first output terminal is floated.

9. The time delay circuit according to claim 6 wherein said 2-to-1 multiplexer (MUX 2:1) consists of a first CMOS GATE and a second CMOS GATE, further, all sources of said first CMOS GATE and said second CMOS GATE are connected as an output terminal of said time delay circuit, and gates of the PMOS of said first CMOS GATE and the NMOS of said second CMOS GATE are connected as a first selection terminal and gates of the NMOS of said first CMOS GATE and the PMOS of said second CMOS GATE are connected as a second selection terminal, furthermore, a drain of the first CMOS GATE is serving as said first input terminal and a drain of the second CMOS GATE is serving as said second input terminal.

10. The time delay circuit according to claim 6 wherein said RS latch is a NOR type RS latch.

* * * * *